Denis R. Tanguy
INVENTOR.

BY Robert Hockfield
ATTORNEY

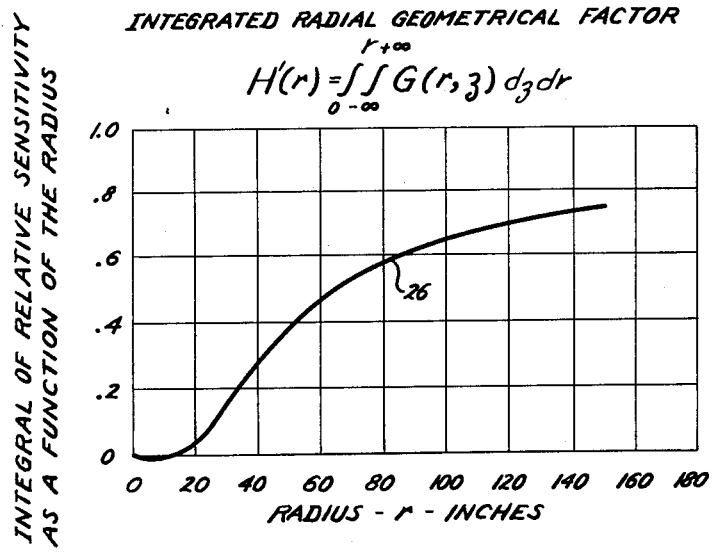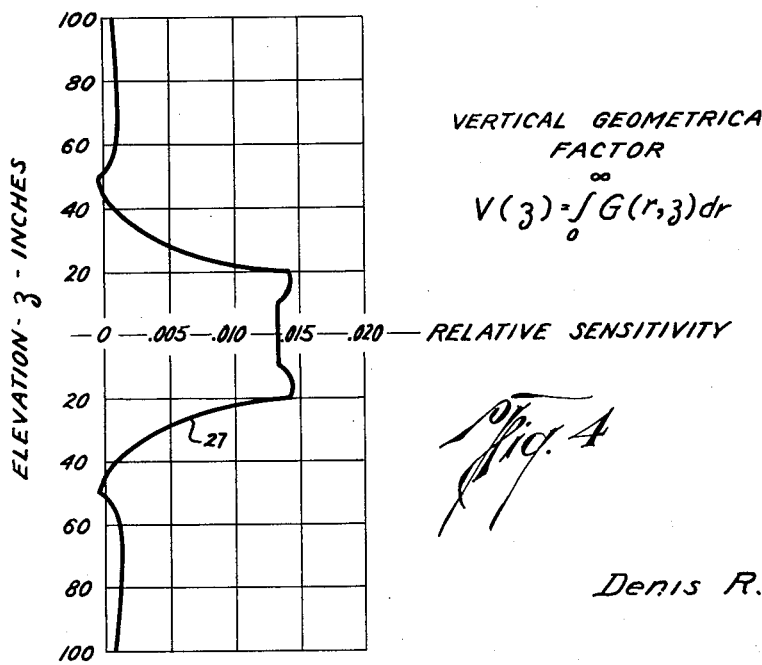

Dec. 4, 1962

D. R. TANGUY 3,067,383

INDUCTION WELL LOGGING

Filed April 16, 1959

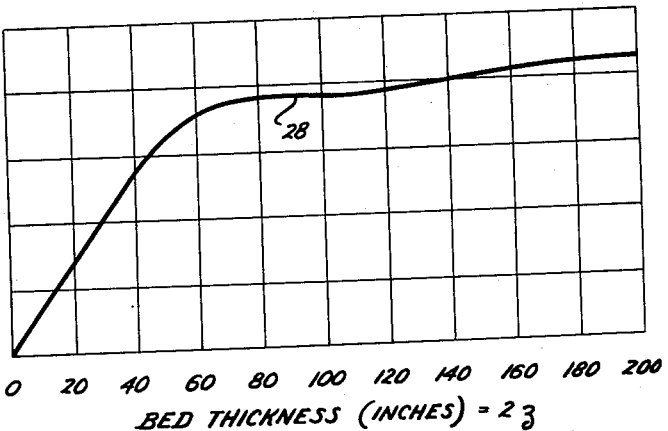

INTEGRATED VERTICAL GEOMETRICAL FACTOR $$V'(z) = \int_{-3}^{+3} \int_{0}^{\infty} G(r,z)\, dr\, dz$$

INTEGRAL OF RELATIVE SENSITIVITY AS A FUNCTION OF BED THICKNESS

BED THICKNESS (INCHES) = 2z

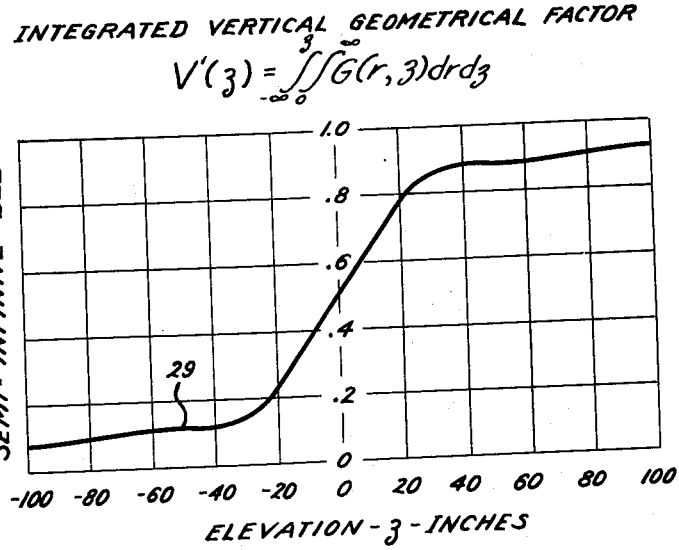

INTEGRATED VERTICAL GEOMETRICAL FACTOR $$V'(z) = \int_{-\infty}^{z} \int_{0}^{\infty} G(r,z)\, dr\, dz$$

RELATIVE RESPONSE AS A FUNCTION OF ELEVATION OF BOUNDRY OF SEMI-INFINITE BED

ELEVATION - z - INCHES

Fig. 6

Denis R. Tanguy
INVENTOR.

BY Robert Hockfield

ATTORNEY

United States Patent Office 3,067,383
Patented Dec. 4, 1962

3,067,383
INDUCTION WELL LOGGING
Denis R. Tanguy, Houston, Tex., assignor to Schlumberger Well Surveying Corporation, Houston, Tex., a corporation of Texas
Filed Apr. 16, 1959, Ser. No. 806,875
6 Claims. (Cl. 324—6)

The present invention relates to induction well logging and, more particularly, pertains to new and improved electromagnetic apparatus for obtaining indications of the electrical conductivity of the earth formations traversed by a borehole.

It has become accepted oil field practice to determine the electrical conductivity of earth formations by utilizing induction logging systems which incorporate the highly-effective focussing techniques disclosed in Patent Nos. 2,582,314 and 2,582,315 issued on January 15, 1952, to H. G. Doll. The present invention relates to induction well logging apparatus utilizing focussing techniques to provide excellent radial penetration characteristics while minimizing the effects of beds adjacent to a particular bed under investigation.

Accordingly, it is an object of the present invention to provide new and improved induction well logging apparatus for obtaining indications of the conductivity of the earth formations traversed by a borehole.

Another object of the present invention is to provide new and improved induction well logging apparatus affording deep radial penetration while minimizing the effects of adjacent beds.

These and other objects of the invention are obtained by providing a plurality of transmitter-receiver two-coil systems adapted to be passed through a borehole which penetrates the earth formations under investigation. A source of electrical energy is coupled to the two-coil systems to energize the same and electrical indicating means is coupled to receive the responses of the two-coil systems. Each such two-coil system produces a total response proportional to $$\frac{(\pm S_T)(\pm S_R)}{D_{TR}}$$

where $D_{TR}$ is one-half the separation distance between the pair of coils considered, $S_T$ is the total area of the transmitter coil of said pair and $S_R$ is the total area of the receiver coil of said pair, plus or minus being assigned to areas $S_T$ and $S_R$ depending upon the relative polarities of the corresponding coils. One of the two-coil systems exhibits a response of a particular polarity and an absolute magnitude at least equal to the response of any of the remaining two-coil systems thereby being definable as a main pair whose coils have a given separation distance. The algebraic sum of the responses of those of the remaining two-coil systems which have a separation distance larger than the given separation distance is of the same polarity as the particular polarity, while the algebraic sum of the responses of those of the remaining two-coil systems which have a separation distance smaller than the given separation distance is of a polarity opposite to the particular polarity.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 3 illustrates the integrated radial geometrical factor for the apparatus of FIG. 1;

FIG. 4 is a graph illustrating a typical vertical sensitivity curve for the apparatus shown in FIG. 1; and FIGS. 5 and 6 are graphs illustrating the integrated vertical geometrical factor for the apparatus of FIG. 1.

Figure 1:
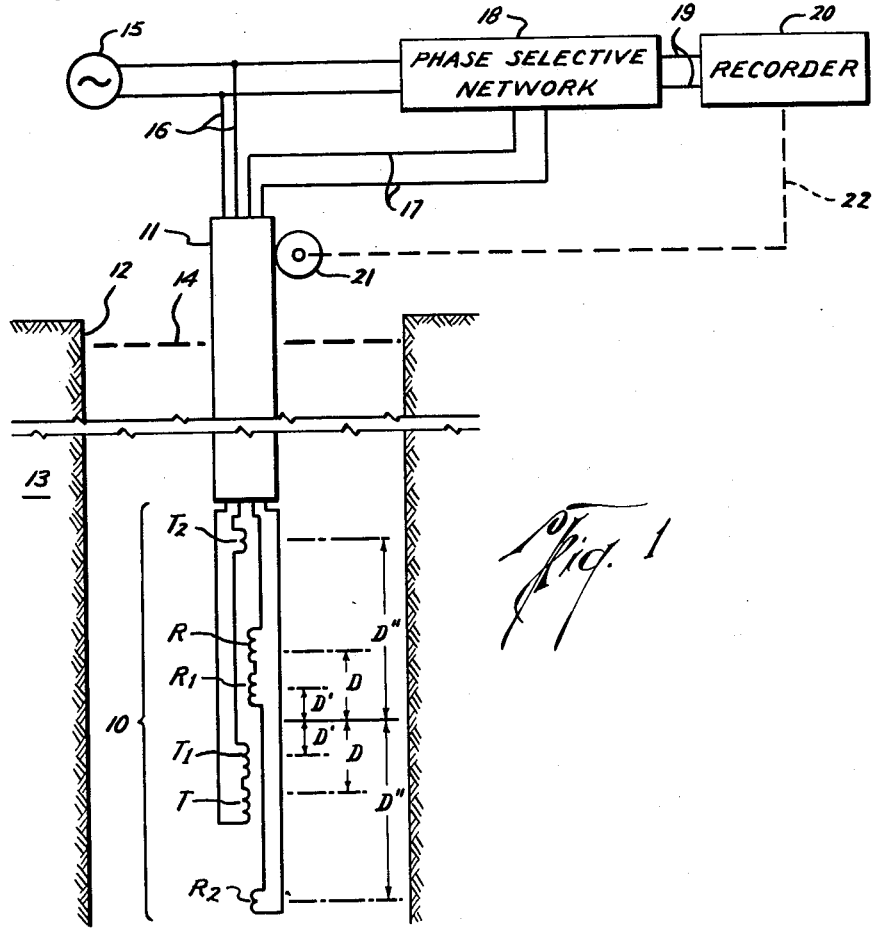
FIG. 1 is a schematic diagram of two-coil systems illustrative of apparatus constructed in accordance with the present invention.

In FIG. 1, a coil system 10 is shown suspended by an armored electric cable 11 in a borehole 12 which penetrates earth formation 13. The borehole may be empty or it may be filled with the usual drilling mud 14, as shown. By means of a winch (not shown) on which the cable 11 is spooled, the coil system 10 may be lowered and raised in the borehole in a conventional manner.

Coil system 10 is comprised of a main transmitter-receiver two-coil system T, R spaced apart a distance 2D, two-coil system $T_1$, $R_1$, spaced apart a distance 2D' which is smaller than the distance 2D, and two-coil system $T_2$, $R_2$ spaced apart a distance 2D'' which is larger than the distance 2D. The number of turns provided on the several coils and the various separation distances D, D' and D'' are selected in a manner to be described more fully hereinafter.

The transmitter coils T, $T_1$ and $T_2$ are connected in series and are supplied with alternating current from a source 15 at the surface of the earth by means of insulated conductors 16 of cable 11. The receiver coils R, $R_1$ and $R_2$ are also connected in series and are coupled via insulated conductors 17 of the cable 11 to an input circuit of a phase selective network 18 which utilizes a signal from the source 15 as a phase reference so as to derive a signal component of a predetermined phase. For example, network 18 may be constructed in accordance with the teachings of Patent No. 2,788,483 of H. G. Doll so that at leads 19 there appears a signal representing the conductive component of the input signal at leads 17, to the exclusion of reactive signal components. Leads 19 are coupled to a conventional recorder 20 having its recording medium driven by a measuring wheel 21 mechanically coupled to cable 11 through an appropriate linkage, schematically represented by a broken line 22. Accordingly, a complete log of conductivity as a function of depth of the system 10 in borehole 12 may be obtained.

In general, the total response of a two-coil system is proportional to $$\frac{(\pm S_T)(\pm S_R)}{D_{TR}} \qquad (1)$$

where $D_{TR}$ is one-half the separation distance between the pair of coils considered, $S_T$ is the total area of the transmitter coil of the pair and $S_R$ is the total area of the receiver coil of the pair, plus or minus being assigned to the areas $S_T$ and $S_R$ depending upon the relative polarities of the corresponding coils.

In the illustration of FIG. 1, the two coils T and R are connected in their respective transmitter and receiver circuits so that a positive signal in the transmitter produces a positive signal in the receiver and thus a given polarity is established. Moreover, coils T and R are such size and spacing that the response calculated in accordance with relationship 1 above for the system T, R is at least equal to the response of any of the remaining two-coil systems. Thus, two-coil system T, R is designated as the main pair having a separation distance 2D.

It has been discovered that by choosing the number of turns and the separation distances for all other two-coil systems which are possible so that: (a) the algebraic sum of the responses of those of the remaining two-coil systems which have a separation distance larger than 2D is of the same polarity as the response of the main two-coil system and (b) the algebraic sum of the responses of those of the remaining two-coil systems which have a separation distance smaller than 2D is of a polarity opposite to the polarity of the main pair, very desirable deep radial investigation characteristics of the apparatus is achieved. Moreover, although very deep radial penetration is afforded, the effects of adjacent beds are inconsequential.

In a typical embodiment of the present invention, the following design data were employed:

$T=R=1$ turn
$T_1=R_1=-0.25$ turn
$T_2=R_2=-0.07$ turn (the polarity sign indicates the polarity of the particular winding)
$D=20$ inches
$D'=10$ inches
$D''=50$ inches Obviously all numbers of turns of either the receiver or transmitter coils, or both, may be multiplied by a common factor.

From calculations employing relationship 1 and the above design data, it will be seen that the algebraic sum of the responses of all transmitter-receiver pairs for which the separation distance is greater than 40 inches is positive while the algebraic sum of all transmitter-receiver pairs for which the separation distance is smaller than 40 inches is negative thereby complying with the requirement set out hereinbefore.

Figure 2:
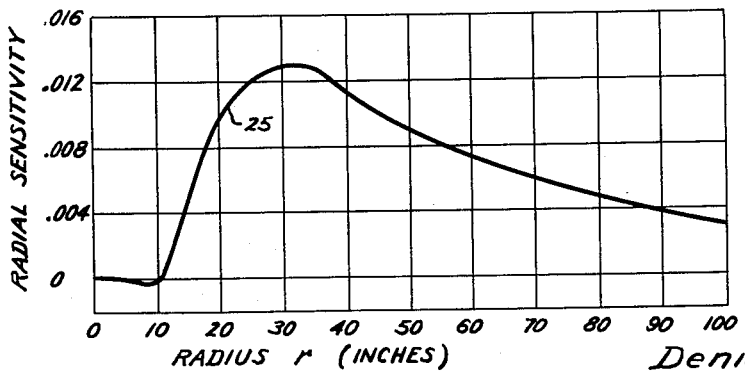
FIG. 2 is a graph illustrating the radial or lateral investigation characteristics of the apparatus of FIG. 1.

In FIG. 2, curve 25 is a plot of the relative contributions of a cylindrical shell of formation, as a function of radial or lateral distance from the axis of the coil system 10 to the shell. This characteristic is usually referred to as the radial geometrical factor and as is evident from this curve, a substantial amount of the response occurs at a radial distance of 30 inches and deeper. This feature of apparatus embodying the invention may be more clearly seen in FIG. 3 in which curve 26 is a plot of the integrated radial geometrical factor. It is quite evident that very deep radial penetration is achieved.

As shown by curve 27 in FIG. 4, which is a plot of relative contribution of a thin layer of formation as a function of vertical distance from the center of the main pair, the vertical geometrical factor for the apparatus is relatively good and this is further shown by curves 28 and 29 of FIGS. 5 and 6, respectively. Curve 28 illustrates the relative contribution of a bed on which the main pair is centered, as a function of bed thickness. Curve 29 illustrates the relative contribution of a bed extending from infinity to a given distance from the center of the main pair, as a function of this distance. It is evident that although apparatus embodying the present invention exhibits excellent deep radial penetration characteristics, contributions to the response of adjacent beds are minimized.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:
1. Apparatus for investigating the electrical characteristics of earth formations traversed by a borehole comprising: a plurality of transmitter coils and a plurality of receiver coils adapted to be passed through a borehole, a source of electrical energy coupled to said transmitter coils to energize the same, and electrical indicating means coupled to said receiver coils, each transmitter-receiver coil pair producing a response proportional to

$$\frac{(\pm S_T)(\pm S_R)}{D_{TR}}$$

where $D_{TR}$ is one-half the separation distance between the pair of coils considered, $S_T$ is the total area of the transmitter coil of said pair and $S_R$ is the total area of the receiver coil of said pair, plus or minus being assigned to the areas $S_T$ and $S_R$ depending upon the relative polarities of the corresponding coils, one of said transmitter-receiver coil pairs exhibiting a response of a particular polarity and a magnitude greater than the response of any of the remaining transmitter-receiver coil pairs, this pair being designated as a main pair having a given separation distance, at least one of the remaining coils being located intermediate the main transmitter-receiver coil pair and at least another of the remaining coils being located to one side of the main transmitter-receiver coil pair, the algebraic sum of the responses of those of the remaining transmitter-receiver coil pairs which have a separation distance larger than said given separation distance being of the same polarity as said particular polarity, and the algebraic sum of the responses of those of the remaining transmitter-receiver coil pairs which have a separation distance smaller than said given separation distance being of a polarity opposite to said particular polarity.

2. Apparatus according to claim 1 wherein said plurality of transmitter coils comprises at least three transmitter coils and said plurality of receiver coils comprises at least three receiver coils.

3. Apparatus according to claim 2 wherein all of said coils are arranged coaxially and spaced vertically apart, wherein the transmitter coils are energized in series circuit relation and wherein the receiver coils are connected in series circuit relation.

4. Apparatus for investigating the electrical characteristics of earth formations traversed by a borehole comprising a coil system adapted to be passed through a borehole and including a main transmitter coil and a main receiver coil spaced apart from one another a selected distance and having a given product of their total areas, a first auxiliary receiver coil and a first auxiliary transmitter coil supported between said main transmitter and receiver coils and having the product of their total areas smaller than said given product, and a second auxiliary transmitter coil and a second auxiliary receiver coil supported on opposite sides of said main transmitter and receiver coils and having a product of their total areas smaller than said given product, means for energizing said transmitter coils in series circuit relation wherein said auxiliary transmitter coils are energized in opposite polarity sense to said main transmitter coil, indicating means coupled to said receiver coils wherein said auxiliary receiver coils are connected in series circuit relation with said main receiver coil and in opposite polarity sense thereto; and means for passing said coil system through a borehole.

5. Apparatus according to claim 4 wherein indications are obtained substantially only of the conductive component of a signal derived in the receiving coils of the two-coil systems.

6. Apparatus for investigating the electrical characteristics of earth formations traversed by a borehole comprising a coil system adapted to be passed through a borehole and including a main transmitter coil and a main receiver coil spaced apart from one another by a selected separation distance, a first auxiliary receiver coil and a first auxiliary transmitter coil supported between said main transmitter and receiver coils, and a second auxiliary transmitter coil and a second auxiliary receiver coil supported on opposite sides of said main transmitter-receiver coil pair, means for energizing said transmitter coils, and indicating means coupled to said receiver coils, each transmitter-receiver coil pair having a relative response of $$\frac{(\pm S_T)(\pm S_R)}{D_{TR}}$$

where $D_{TR}$ is one-half the separation distance between the pair of coils considered, $S_T$ is the total area of the transmitter coil of said pair and $S_R$ is the total area of the receiver coil of said pair, plus or minus being assigned to the areas $S_T$ and $S_R$ depending upon the relative polarities of the corresponding coils, the main-transmitter-main-receiver coil pair exhibiting a relative response of a particular polarity and a magnitude greater than the relative response of any of the remaining transmitter-receiver coil pairs, the algebraic sum of the responses of those of the remaining transmitter-receiver coil pairs which have a separation distance larger than said selected separation distance being of the same polarity as said particular polarity, and the algebraic sum of the responses of those of the remaining transmitter-receiver coil pairs which have a separation distance smaller than said selected separation distance being of a polarity opposite to said particular polarity.

References Cited in the file of this patent

UNITED STATES PATENTS

| | | |
|---|---|---|
| 2,582,314 | Doll | Jan. 15, 1952 |
| 2,582,315 | Doll | Jan. 15, 1952 |
| 2,723,375 | Schuster | Nov. 8, 1955 |
| 2,761,103 | Doll | Aug. 28, 1956 |